(12) United States Patent
Williams et al.

(10) Patent No.: US 7,097,796 B2
(45) Date of Patent: Aug. 29, 2006

(54) METHOD OF PREPARING A DECORATED MOLDED ARTICLE

(75) Inventors: Ronald W. Williams, Irving, TX (US); Christopher Cooper, Moon Township, PA (US); Stephen G. Smith, Bethel Park, PA (US); Timothy J. Jacobs, Emsworth, PA (US)

(73) Assignee: Bayer Materialscience LLC, Pittsburgh, PA (US)

( * ) Notice: Subject to any disclaimer, the term of this patent is extended or adjusted under 35 U.S.C. 154(b) by 221 days.

(21) Appl. No.: 10/436,557

(22) Filed: May 13, 2003
(Under 37 CFR 1.47)

(65) Prior Publication Data
US 2004/0227267 A1 Nov. 18, 2004

(51) Int. Cl.
*B29C 45/14* (2006.01)

(52) U.S. Cl. ............... 264/132; 264/134; 425/126.1

(58) Field of Classification Search .......... 264/132; 236/134; 425/126.1, 126.2; 156/267, 270, 156/277
See application file for complete search history.

(56) References Cited

U.S. PATENT DOCUMENTS

| | | | | |
|---|---|---|---|---|
| 3,292,209 A | | 12/1966 | Borkmann | 18/5 |
| 3,468,050 A | * | 9/1969 | Pool | 40/302 |
| 3,816,207 A | | 6/1974 | Robertson et al. | 101/7 |
| 3,883,473 A | * | 5/1975 | Kucsma | 524/494 |
| 4,643,789 A | | 2/1987 | Parker et al. | 156/219 |
| 4,650,533 A | | 3/1987 | Parker et al. | 156/219 |
| 4,812,171 A | * | 3/1989 | Brettle et al. | 523/161 |
| 5,215,826 A | | 6/1993 | Shimanski et al. | 428/483 |
| 5,350,553 A | * | 9/1994 | Glaser et al. | 264/155 |
| 5,548,110 A | * | 8/1996 | Storch et al. | 235/462.07 |

(Continued)

FOREIGN PATENT DOCUMENTS

EP     0 309 751     4/1989

(Continued)

OTHER PUBLICATIONS

Patent Abstracts of Japan vol. 012, No. 364 (M-747), Sep. 29, 1988.

*Primary Examiner*—Michael P. Colaianni
*Assistant Examiner*—Patrick Butler
(74) *Attorney, Agent, or Firm*—Joseph C. Gil; Aron Preis (57) ABSTRACT

A method of preparing a molded article by means of an in-mold decoration process, is described. The method includes, providing a laminate (4) of a plurality of separate releasable thermoplastic labels (14) superposed over a carrier film (26). A decoration (86) is applied in-line to the exposed second surface (68) of the labels (14), thereby forming a decorated laminate (5). The decorated laminate (5) is forwarded and indexed into a mold (20) such that the exposed first surface (77) of the carrier film (26) abuts at least a portion of the interior surface of the mold, and the decorated second surface (68) of the label (14) faces the interior space of the mold. Plastic material (e.g., thermoplastic material) is injected into the mold against the decorated surface of the label, thus forming a molded article. The carrier film (26) is then separated from the molded article. At least a portion of the surface of the molded article prepared in accordance with the present method is defined by the first surface (71) of at least one label. Molded articles that may be prepared according to the present method include identification cards, such as driver's licenses and animal tags (e.g., cattle tags), and lenses, such as tinted ophthalmic lenses and sunshade lenses.

21 Claims, 4 Drawing Sheets

U.S. PATENT DOCUMENTS

| | | | |
|---|---|---|---|
| 5,725,261 A | 3/1998 | Rahn | 292/307 R |
| 5,846,624 A * | 12/1998 | Denklau et al. | 428/42.3 |
| 5,914,170 A | 6/1999 | Rabe et al. | 428/119 |
| 5,985,079 A | 11/1999 | Ellison | 156/244.23 |
| 6,114,023 A | 9/2000 | Schwarz et al. | 428/315.5 |
| 6,156,411 A | 12/2000 | Jennings | 428/195 |
| 6,390,584 B1 | 5/2002 | Larson et al. | 347/16 |
| 6,773,653 B1 * | 8/2004 | Miller et al. | 264/447 |

FOREIGN PATENT DOCUMENTS

| | | |
|---|---|---|
| EP | 1 174 240 A1 | 1/2002 |
| WO | 00/30827 | 6/2000 |
| WO | 02/060667 A1 | 8/2002 |

* cited by examiner

METHOD OF PREPARING A DECORATED MOLDED ARTICLE

DESCRIPTION OF THE INVENTION

The present invention relates to a process of preparing a molded article by means of in-mold decoration. The process involves providing a laminate of a carrier film having a plurality of separate thermoplastic labels reversibly adhered thereto. A decoration is then applied to the exposed second surface of the labels. The decorated laminate is indexed into a mold such that the carrier film abuts at least a portion of the interior surface of the mold, and the decorated surface of the label faces the interior space of the mold. Plastic material (e.g., thermoplastic material) is injected into the mold against the decorated surface of the label. The carrier film is separated from the molded article after opening the mold. At least a portion of the surface of the molded article is defined by the first surface of the label (which was superposed over the carrier film). In the method of the present invention, the separate labels are formed, e.g., by a die-cutting process, prior to the decoration application step. The method of the present invention is preferably performed continuously.

The preparation of decorated molded articles by means of injection molding is known. Typically, a decorated film insert having first and second surfaces, is placed in a mold, such that the first surface of the film insert abuts at least a portion of the interior surface of the mold. The second surface of the film insert faces the interior space of the mold. The first and/or second surfaces of the film insert may be decorated, e.g., with indicia. The mold is closed, and a plastic material, typically a molten thermoplastic resin, is injected into the mold. The injected molten thermoplastic resin contacts and fuses with the second surface of the film insert. The injected thermoplastic resin is allowed to cool and harden within the mold, and a decorated molded article is removed from the mold.

U.S. Pat. Nos. 4,643,789 and 4,650,533 disclose the preparation of a releasable laminate that may be used in a continuous in-mold decoration process. The '789 and '533 patents disclose the preparation of a releasable laminate that includes a carrier film and a transfer film. The free surface of the transfer film of the releasable laminate is next printed with decorating indicia. The fully printed releasable laminate is then die-cut such that the transfer film is penetrated while the carrier film is not. Unwanted portions of the transfer film are next separated from the carrier film. The releasable laminate, having pre-cut decorated transfers thereon, is then indexed continuously into a mold in which the in-mold decoration formation of a molded article is performed.

In-mold decoration processes which involve formation of a plurality of separate decorated transfers on a carrier film, e.g., by means of die-cutting, after the printing step (such as described in the '789 and '533 patents) are undesirable due in part to the lack of process flexibility associated therewith. Such pre-printing processes (relative to the die-cutting step) typically involve the formation and use of a whole role of pre-printed transfers on a carrier film. A whole roll of pre-printed transfers on a carrier film is not suitable for in-line modification of the printed decoration. For example, if the roll contains a sequential series of pre-printed bar-code transfers, rejection of molded articles due to molding mishaps will result in the formation of a series of molded bar-coded articles that are not sequential (i.e., some bar-coded molded articles will be missing from the series).

Processes that involve the formation of separate decorated transfers on a carrier film by means of die-cutting, after the printing step, can be complicated due to the removal of unwanted portions of the transfer film, which is done in-line with the in-mold decoration process. For example, incomplete separation of unwanted portions of the transfer film can result in tearing of the releasable laminate, and subsequent shut-down of the line. In addition, unwanted portions of the transfer film that are not completely separated from the carrier film can end-up on the resulting molded articles, necessitating their rejection.

It would be desirable to develop additional methods of preparing decorated molded articles by means of injection molding. Such new methods should allow for improved process flexibility, such as modifying the applied decoration in-line prior to the injection molding step. In addition, it is desirable that such newly developed methods be less complicated and less prone to line shut-downs due to problems associated with improper or incomplete excess transfer film separations.

In accordance with the present invention, there is provided, a method of preparing a molded article comprising the sequential steps of:
  (a) providing a laminate comprising,
    (i) a carrier film having a first surface and a second surface, and
    (ii) a plurality of separate thermoplastic labels each having a first surface and a second surface, the second surface of said labels being free of decoration,
    the first surface of each label being superposed over the second surface of said carrier film, said carrier film being releasable from each of said labels;
  (b) applying, in-line, a decoration on the second surface of said labels of said laminate, thereby forming a decorated laminate;
  (c) indexing said decorated laminate into a mold having an interior surface, the first surface of said carrier film abutting at least a portion of the interior surface of said mold;
  (d) injecting plastic material into said mold against the decorated second surface of said label, thereby forming a molded article; and
  (e) separating said carrier film from said molded article, wherein at least a portion of the surface of said molded article is defined by the first surface of at least one label.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings.

Unless otherwise indicated, all numbers or expressions, such as those expressing structural dimensions, process conditions, etc. used in the specification and claims are understood as modified in all instances by the term "about."

In FIGS. 1 through 4, like reference numerals and characters designate the same components and structural features.

DETAILED DESCRIPTION OF THE INVENTION

An important aspect of the method of the present invention is the in-line decoration of the separate thermoplastic labels prior to the sequential step of indexing the decorated laminate into a mold. In-line decorating of the separate labels of the laminate allows for greater process flexibility relative to prior in-mold decoration processes in which a transfer film is printed, followed by die-cutting of the printed transfer film to form separate printed transfers on a carrier film, as discussed previously herein. If molded articles are rejected, e.g., due to molding mishaps, the specific labels (e.g., bar codes) of those rejected articles can be re-decorated in-line and used to form replacement molded articles, in the present method. In addition, in-line tearing of the laminate due, for example, to incomplete separation of unwanted portions of the transfer film from the carrier film (after an in-line die-cutting step) is avoided in the present method.

Figure 2:
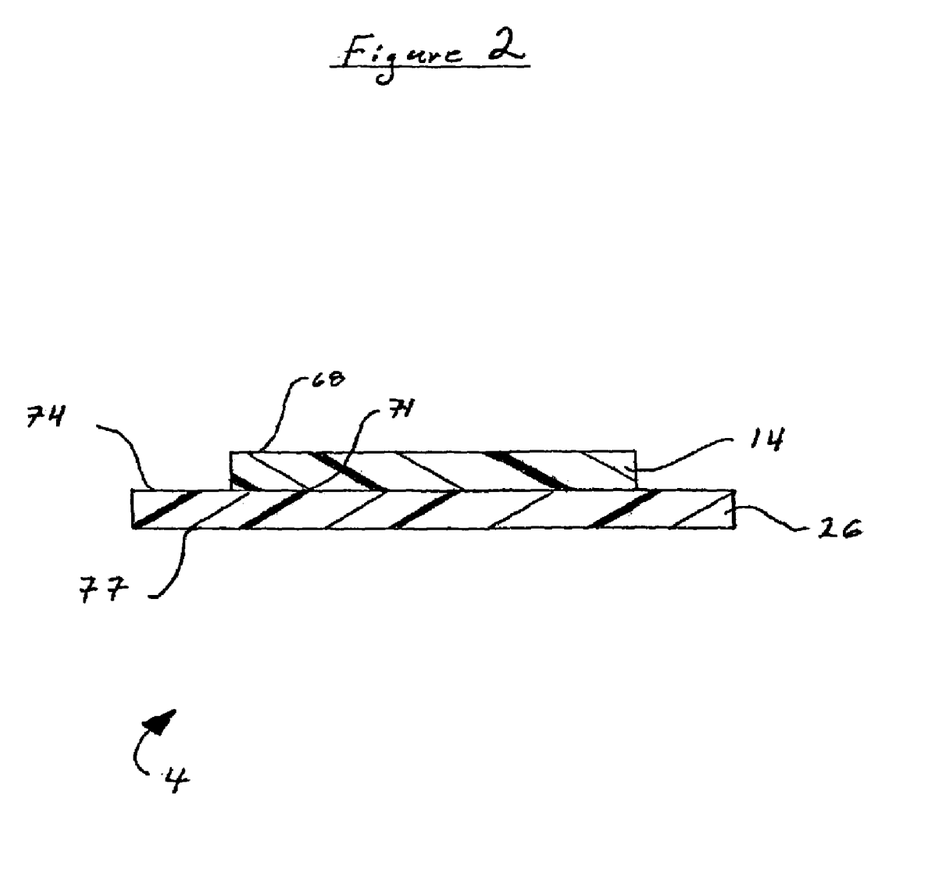
FIG. 2 is a representative sectional view of a laminate used in the method of the present invention.

A laminate which includes a carrier film and a plurality of separate thermoplastic labels is provided in the method of the present invention. With reference to FIG. 2 of the drawings, laminate 4 includes a thermoplastic label 14 having a second surface 68 and a second surface 71, and a carrier film 26 having a first surface 77 and a second surface 74. First surface 71 of thermoplastic label 14 is superposed over second surface 74 of carrier film 26.

In FIG. 2, first surface 71 of label 14 abuts second surface 74 of carrier film 26. In an embodiment of the present invention, at least one additional layer (not shown) may be interposed between first surface 71 of label 14 and second surface 74 of carrier film 26. Such an additional interposed layer(s) is typically used to effect release of carrier film 26 from label 14, particularly in those instances when carrier film 26 is not itself releasable from label 14. Layers that may be interposed between label 14 and carrier 26 include, but are not limited to, layers containing or fabricated from silicones, waxes and fluorinated polyolefins, such as polytetrafluoroethylene and polyvinylidene difluoride, and combinations thereof.

Laminate 4 may be formed by separately laminating thermoplastic labels 14 to carrier film 26, by art recognized means, such as heat lamination. Alternatively, laminate 4 may be formed by means of a process, which includes, (a) providing a precursor laminate comprising, (i) a carrier film (e.g., carrier film 26) having a first surface (e.g., 77) and a second surface (e.g., 74), and (ii) a thermoplastic film having a first surface and a second surface (not shown in the drawings). The second surface of the carrier film is superposed over the first surface of the thermoplastic film, and the carrier film is releasable from the thermoplastic film. In a second step (b), the precursor laminate is die-cut such that the thickness of the thermoplastic film is fully penetrated while the carrier film is not substantially penetrated (preferably not penetrated at all). In a third step (c), excess portions of the thermoplastic film are separated from the carrier film, thereby forming laminate 4 comprising carrier film 26 and a plurality of separate thermoplastic labels 14.

In an embodiment of the present invention, first surface 71 of thermoplastic label 14 has a decoration thereon. First surface 71 of label 71 may be decorated prior to its lamination to carrier film 26, by means known to the skilled artisan (e.g., ink-jet printing, laser-jet printing, screen printing or dying, such as dip-dying). When first surface 71 of label 14 has a decoration thereon, molded articles prepared according to the present method have a decoration on at least a portion of their surface (defined by first surface 71 of label 14), in addition to a decoration embedded between the injection molded plastic material and second surface 68 of label 14. Such a combination of decorations on the first and second surfaces of the label can, for example, provide a molded article having the appearance of a 3-dimensional image thereon. Typically, first surface 71 of label 14 is free of decorations.

The laminate used in the method of the present invention is preferably formed in a separate process (e.g., by means of laminating separate labels onto the carrier film, or the above described die-cutting process), and then collected, e.g., on a roll. The laminate is then drawn, typically continuously, off of the roll in the present method.

The carrier film of the laminate may be a single layer or multi-layered film. The carrier film may be fabricated from, for example, paper, thermoplastic vinyl polymers, thermoplastic polyolefins, thermoplastic poly(meth)acryaltes, thermoplastic polyesters, thermoplastic polycarbonates, cellulose derivatives, and single layered and multi-layered combinations thereof. In an embodiment of the present invention, the carrier film is fabricated from thermoplastic polyvinyl chloride, thermoplastic polyethylene, thermoplastic polypropylene, thermoplastic polystyrene, cellulose acetate, cellulose acetate butyrate, ethyl cellulose, cellophane and single layered and multi-layered combinations thereof. Preferably, the carrier film is a single layer film fabricated from thermoplastic polyester.

The carrier film typically has a thickness of at least 0.3 mils (7.6 microns), preferably at least 0.5 mils (12.7 microns), and more preferably at least 0.8 mils (20.3 microns). The carrier film also typically has a thickness of less than or equal to 3 mils (76.2 microns), preferably less than or equal to 2 mils (50.8 microns), and more preferably less than or equal to 1.5 mils (38.1 microns). The carrier film may have a thickness ranging between any combination of these upper and lower values, inclusive, e.g., from 0.3 mils (7.6 microns) to 3 mils (76.2 microns), preferably from 0.5 mils (12.7 microns) to 2 mils (50.8 microns), and more preferably from 0.8 mils (20.3 microns) to 1.5 mils (38.1 microns).

The thermoplastic labels of the laminate and the thermoplastic film of the precursor laminate may each be single layer or multi-layered thermoplastic films. Preferably, the thermoplastic labels of the laminate and the thermoplastic film of the precursor laminate are each single layer films. The thermoplastic labels of the laminate and the thermoplastic film of the precursor laminate may each be fabricated from thermoplastic polyurethane, thermoplastic poly(meth) acrylate, thermoplastic graft copolymer, thermoplastic polyamide, thermoplastic polyester and thermoplastic polycarbonate, and single layer and multi-layered combinations thereof. Preferably, the thermoplastic labels of the laminate and the thermoplastic film of the precursor laminate each comprise at least one thermoplastic polyurethane layer.

The thermoplastic labels of the laminate and the thermoplastic film of the precursor laminate each typically have a thickness of at least 0.25 mils (6.4 microns), more typically at least 1 mil (25.4 microns), preferably at least 2 mils (50.8 microns), and more preferably at least 3 mils (76.2 mils). The thermoplastic labels of the laminate and the thermoplastic film of the precursor laminate each also typically have a thickness of less than or equal to 500 mils (12,700 microns), more typically less than or equal to 100 mils (2,540 microns), preferably less than or equal to 50 mils (1,270 microns), and more preferably less than or equal to 10 mils (254 microns). The thermoplastic labels of the laminate and the thermoplastic film of the precursor laminate may each have a thickness ranging between any combination of these upper and lower values, inclusive, e.g., typically from 0.25 mils (6.4 microns) to 500 mils (12,700 microns), more typically from 1 mil (25.4 microns) to 100 mils (2,540 microns), preferably from 2 mils (50.8 microns) to 50 mils (1,270 microns), and more preferably from 3 mils (76.2 microns) to 10 mils (254 microns).

The laminate and the precursor laminate may each have a thickness of at least 0.55 mils (14 microns), preferably at least 1.5 mils (38.1 microns) or 2.5 mils (63.5 mils), and more preferably at least 3.8 mils (96.5 microns). The laminate and the precursor laminate may each have a thickness of less than or equal to 503 mils (12,776 microns), preferably less than or equal to 102 mils (2,591 microns) or 52 mils (1,321 microns), and more preferably less than or equal to 11.5 mils (292 microns). The laminate and the precursor laminate may each have a thickness ranging between any combination of these upper and lower values, inclusive, e.g., from 0.55 mils (14 microns) to 503 mils (12,776 microns), preferably from 1.5 mils (38 microns) to 102 mils (2,591 microns), and more preferably from 3.8 mils (96.5 microns) to 11.5 mils (292 microns).

A decoration is applied, in-line, on the second surface (e.g., 68) of the labels (e.g., 14) of the laminate (e.g., 4) in the method of the present invention. The decoration step results in the formation of a decorated laminate, e.g., decorated laminate 5 in FIGS. 1 and 3 (as will be discussed further herein). The decoration may be applied by art-recognized methods, including, but not limited to: printing, such as ink-jet printing, laser-jet printing and screen printing; and dying, such as dip dying. In an embodiment, the decoration is applied by means of ink-jet printing. The decoration applied to the second surface of the labels may be selected from, for example, indicia, patterns, designs and combinations thereof. The applied decoration may be black-and-white and/or may be colored. More specific examples of decorations that may be applied to the second surface of the labels include, but are not limited to, numbers, letters, photographic images, one-dimensional bar codes, two-dimensional bar codes, and combinations thereof. The applied decoration may also be in the form of a continuous or feathered transparent color, e.g., as would be desirable when the molded article prepared in accordance with the present method is a tinted ophthalmic lens or a sunshade lens. In an embodiment of the present invention, the decoration applied to the second surface of the labels is selected from one-dimensional bar codes and/or two-dimensional bar codes.

The colorants (e.g., inks and/or dyes) used in forming the decoration on the first and/or second surfaces of the labels may be selected from, for example, static colorants, photochromic colorants, electrically conductive colorants and combinations thereof. Static colorants, e.g., static pigments and dyes, do not substantially change color upon exposure to ultraviolet (UV) light, as is known to the skilled artisan. Static colorants that may be used include those known to the skilled artisan, for example, inorganic pigments and dyes (e.g., iron oxides), organic pigments and dyes (including carbon blacks) and combinations thereof.

Photochromic colorants or substances (e.g., photochromic dyes) reversibly change color upon exposure to UV light, as is known to the skilled artisan. Examples of photochromic substances that may be used in the present invention include art-recognized inorganic and organic photochromic substances. Examples of organic photochromic substances that may be used include, but are not limited to, spiro(indoline) naphthoxazines, spiro(indoline)benzoxazines, chromenes (such as benzopyrans and naphthopyrans), organo-metal dithizonates (e.g., mercury dithizonates), fulgides (e.g., 3-furyl and 3-thienyl fulgides), fulgimides (e.g., 3-furyl and 3-thienyl fulgimides) and combinations thereof. The use of photochromic substances in the formation of the decoration results in a molded article having photochromic properties, such as photochromic ophthalmic lenses, photochromic sun lenses and photochromic glazings.

Electrically conductive colorants (e.g., electrically conductive inks) that may be used include those known to the skilled artisan, such as electrically conductive inks comprising electrically conductive carbon black pigments and/or fibrils and electrically conductive ground metals. The use of electrically conductive colorants in the formation of the decoration results in a molded article having electrically conductive properties, such as molded articles having electromagnetic shielding properties and/or molded articles that may be used as part of an electrical circuit.

Figure 3:
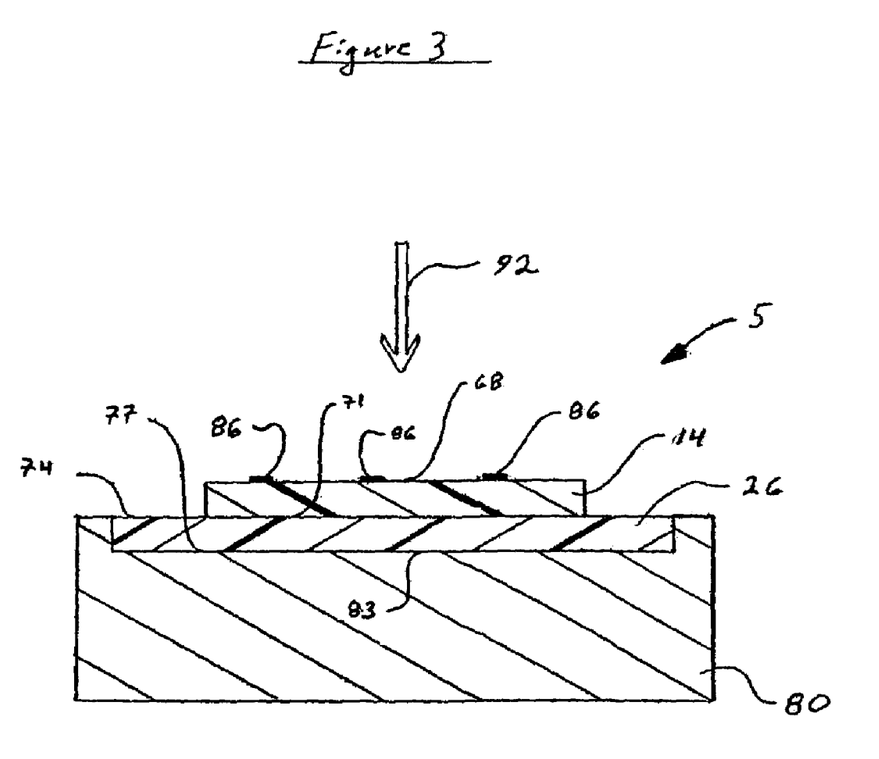
FIG. 3 is a representative sectional view of a printed laminate indexed into position within a portion of a mold.

After the decoration step, the decorated laminate is indexed into a mold having an interior surface, such that the first surface of the carrier film abuts at least a portion of the interior surface of the mold. Correspondingly, the decorated second surface of the label faces the open interior space of the mold. With reference to FIG. 3, a sectional view of a decorated laminate 5 in abutting relationship with the interior surfaces of a mold-half is depicted. First surface 77 of carrier film 26 of decorated laminate 5 abuts the interior surface 83 of mold-half 80. The rest of the mold (not shown), when combined with mold-half 80 defines an interior mold space (not shown).

Indexing of the decorated laminate into the mold may be achieved by art-recognized methods, including for example, automatic indexing and manual indexing. Manual indexing typically involves forwarding the decorated laminate into the mold until it is determined to be visually aligned. Automatic indexing typically involves forwarding a predetermined length of decorated laminate into the mold, such that it is properly aligned. The length of decorated laminate forwarded can be determined, for example, by means of: the number of revolutions of a wheel in contact with the laminate as it passes thereunder; and/or an electric eye or laser which counts the number of index markings previously applied to the decorated laminate (typically along the edge thereof).

After indexing and positioning the decorated laminate within the mold, plastic material is injected into the interior space of the mold and against the decorated second surface of the label. With further reference to FIG. 3, plastic material (not shown) is injected against second surface 68 (having a decoration 86 thereon) of label 14 of decorated laminate 5, as indicated by arrow 92. The plastic material is typically injected into the mold in a heated molten state (in the case of a thermoplastic material) or in a liquid state (in the case of a thermoset plastic material), and fuses and/or reacts with the second surface 68 of label 14, thus embedding decoration 86 between the injected plastic material and label 14. The plastic material may be injected directly against second surface 68 (e.g., and an angle of 90°), or indirectly thereagainst (e.g., at an angle of less than 90°) by art-recognized methods (e.g., by means of gates, not shown).

The plastic material injected into the mold and against the second surface of the label may be selected from thermoplastic materials and/or thermoset plastic materials. As used herein and in the claims the term "thermoset plastic material" and similar terms means plastic materials having a three dimensional crosslinked network resulting from the formation of covalent bonds between chemically reactive groups, e.g., active hydrogen groups and free isocyanate groups. Thermoset plastic materials that may be injected into the mold and against the second surface of the label, include those known to the skilled artisan, such as: crosslinked polyurethanes; crosslinked polyepoxides; crosslinked polyesters; and crosslinked polycarbonates, such as radically polymerizable ethylenically unsaturated polycarbonates, e.g., prepared using CR-39 monomer, commercially available from PPG Industries, Inc. Of the thermoset plastic materials, crosslinked polyurethanes and crosslinked polycarbonates are preferred.

Thermoset plastic materials may be injected into the mold by means of the art-recognized process of reaction injection molding. Reaction injection molding of a polyurethane, for example, typically involves, as is known to the skilled artisan, injecting separately, and preferably simultaneously, into the mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The mold into which the reactive components are injected may optionally be heated to ensure and/or hasten complete reaction of the injected components. Upon complete reaction of the injected components, the mold is opened and the tubular assembly according to the present invention is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials that may be injected into the mold and against the decorated second surface of the labels include, but are not limited to, thermoplastic polyurethane, thermoplastic polyurea, thermoplastic polyimide, thermoplastic polyamide, thermoplastic polyamideimide, thermoplastic polyester, thermoplastic copolyester, thermoplastic polycarbonate, thermoplastic polysulfone, thermoplastic polyketone, thermoplastic olefins (such as thermoplastic polyethylene and polypropylene), thermoplastic acrylonitrile-butadiene-styrene, thermoplastic polystyrene, thermoplastic silicones, thermoplastic acrylic ester-modified styrene acrylonitrile termolymers (ASA), thermoplastic ethylene-vinyl acetate polymers (EVA), thermoplastic acrylonitrile ethylene styrene polymers (AES) and mixtures or thermoplastic compositions containing one or more thereof. Of the thermoplastic materials that may be injected into the mold and against the decorated second surface of the labels, thermoplastic polyurethanes are preferred.

The plastic material (e.g., thermoplastic material and/or thermoset plastic material) injected into the mold and against the decorated second surface of the labels, may optionally be reinforced with a material selected from glass fibers, glass beads, carbon fibers, metal flakes, polyamide fibers, nanoparticulate materials (e.g., having average particle sizes in the range of from 1 nm to 1000 nm, such as nanoparticulate clays), talc and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the plastic materials, injected into the mold and against the decorated second surface of the labels, in a reinforcing amount, e.g., in an amount of from 5 percent by weight to 60 percent by weight, based on the total weight of the plastic material injected.

The plastic material injected into the mold and against the decorated surface of the label is typically allowed to cool and/or react, and at least partially solidify prior to opening the mold. The carrier film may be separated from the molded article (which now includes the printed label), concurrently upon opening the mold, after opening the mold while the molded article is still within a portion of the opened mold, or after removing the molded article from the mold.

Figure 4:
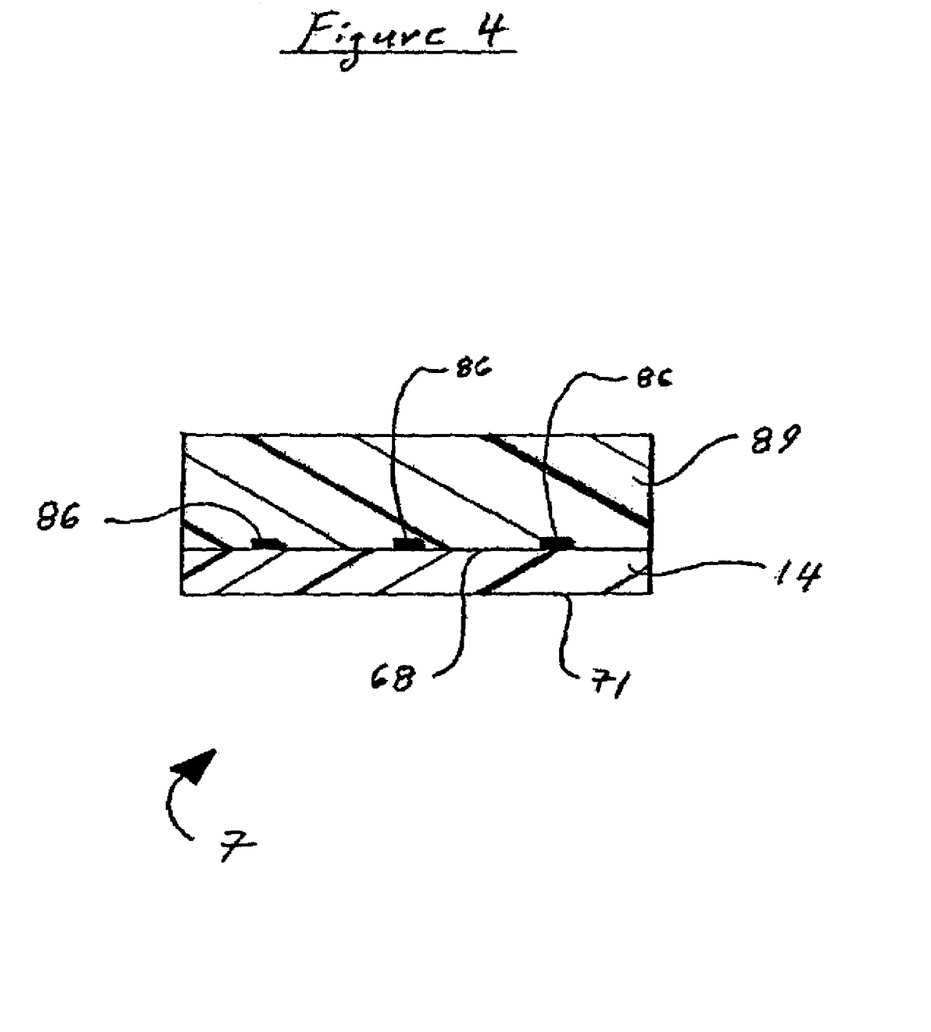
FIG. 4 is a representative sectional view of a molded article prepared in accordance with the method of the present invention.

Upon separation from the carrier film, at least a portion of the surface of the molded article is defined by the first surface of at least one label (as more than one label may be indexed into the mold prior to injection of the thermoplastic material). With reference to FIG. 4, there is depicted a sectional view of a molded article 7 prepared in accordance with the method of the present invention. Molded article 7 includes a molded thermoplastic material portion 89 which is fused to second surface 68 of label 14. Second surface 68 of label 14 has a decoration 86 thereon, which is embedded between plastic material 89 and label 14. A portion of the surface of molded article 7 is defined by first surface 71 of label 14. While second surface 68 of label 14 is depicted in FIG. 4 as a sharp and well defined line, it should be understood that during the injection molding step, fusion and/or reaction between plastic material 89 and second surface 68 may result in a more diffused interface therebetween.

Upon separation from the molded article, the carrier film may be disposed of. In an embodiment of the present invention, the carrier film, after separation from the molded article, is reused. After separation, the carrier film may be used to reform the laminate, for example, by means of laminating separate releasable labels thereto, or laminating a releasable thermoplastic film thereto followed by die-cutting to form separate releasable labels, as described previously herein.

The method of the present invention may be performed as a batch process (e.g., in which the laminate is provided in the form of a sheet) or as a continuous process (e.g., in which the laminate is provided in the form of a roll). Preferably, the present method is performed continuously.

Figure 1:
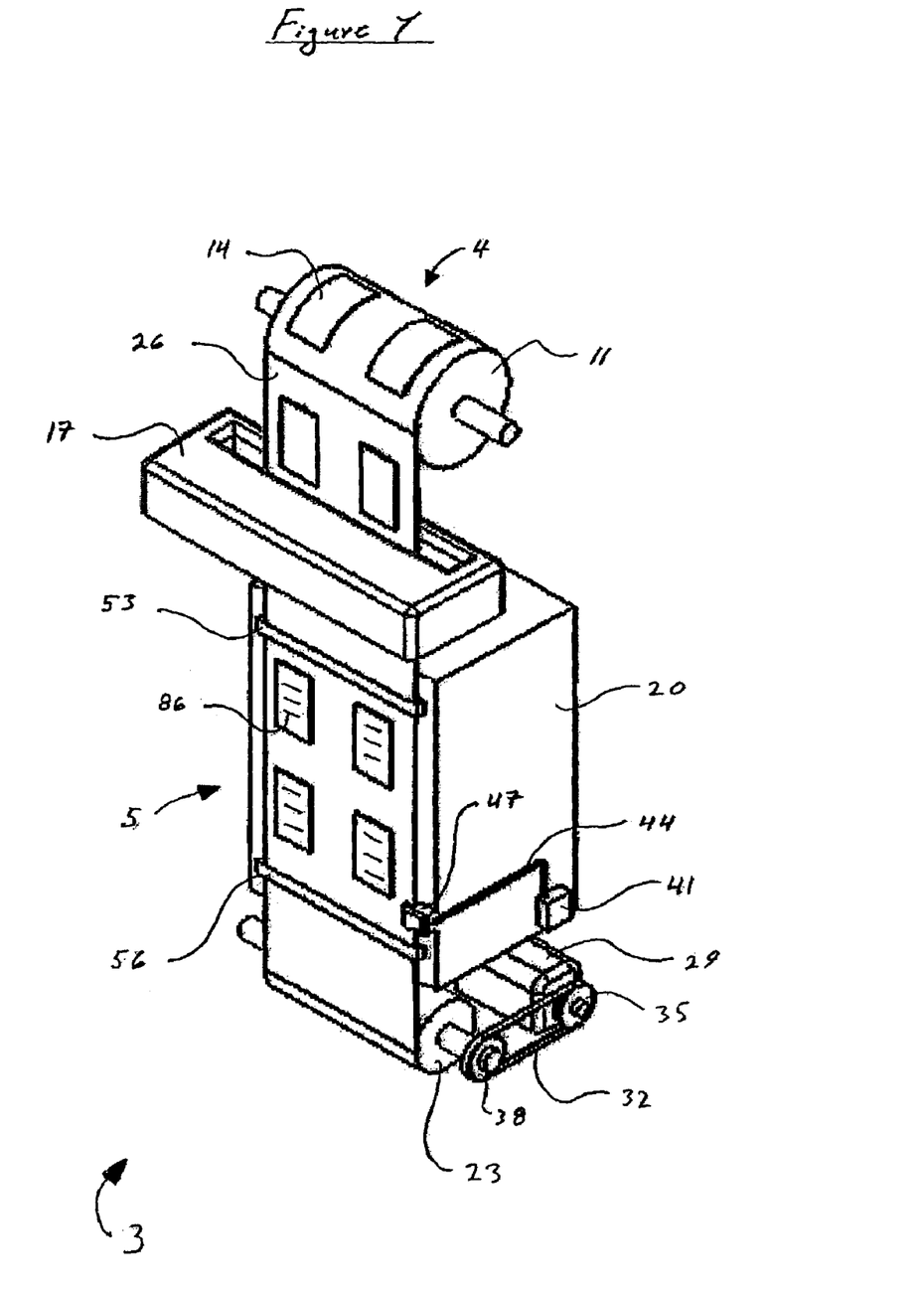
FIG. 1 is a schematic representation of a mold and printing assembly that may be used in the method of the present invention.

The method of the present invention may be described with reference to FIG. 1 of the drawings. The mold and printing assembly 3 of FIG. 1 includes a roll 11 of a laminate 4, an in-line printer 17 (which may be, for example, a digital ink-jet printer or a digital laser-jet printer), a mold-half 20, and a take-up roll 23. Laminate 4 includes carrier film 26 having a plurality of labels 14 thereon. Assembly 3 also includes a drive motor 29 having a pulley 35, which is connected to a pulley 38 on take-up roll 23 by means of a belt 32. An electronic eye 47, which is positioned along an edge of carrier film 26, is connected to a programmable controller 41 by means of electrical connection 44, which is further connected to drive motor 29 by means of another electrical connection (not shown).

Laminate 4 is forwarded through in-line printer 17, which applies a decoration 86, e.g., a one dimensional bar code, to the second (or exposed) surface of labels 14. A decorated laminate 5 is forwarded from in-line printer 17, through guide bar 53, and is indexed into position within mold-half 20. Indexing of decorated laminate 5 into mold-half 20 is achieved by means of the electronic eye 47/programmable controller 41/drive motor 29 arrangement. Electronic eye 47 counts the number of indexing marks (not shown) along the edge of carrier film 26, which information is forwarded to programmable controller 41 via electrical connection 44. Programmable controller 41 processes the information from electric eye 47, and controls the extent to which drive motor 29 draws more laminate 4 off of roll 11 via take-up roll 23.

After indexing decorated laminate 5 into place within mold-half 20, another mold-half (not shown) is closed over the indexed decorated laminate 5 and mold-half 20, thus forming a closed mold (not shown). Plastic material is then injected into the closed mold. The injected plastic material is typically allowed to cool and/or react, and to at least partially solidify within the closed mold. The closed mold is opened, and carrier film 26 is separated from the molded article (not shown). Separation of carrier film 26 from the molded article may be achieved manually. Alternatively, carrier film 26, with the molded article still attached thereto, may be forwarded such that it contacts separation bar 56, which serves to separate carrier film 26 from the molded article. At least a portion of the surface of the molded article separated from carrier film 26 is defined by the first surface of label 14. See molded article 7 of FIG. 4.

After separation of the molded article (e.g., molded article 7 of FIG. 4), carrier film 26 is forwarded and collected on take-up roll 23. The carrier film 26 collected on take-up roll 23 may later be used to form another roll 11 of laminate 4. Alternatively, additional labels 14 may be continuously applied to carrier film 26 as it is forwarded from take-up roll 23 to roll 11 (not shown).

Molded articles that may be prepared according to the present invention include, but are not limited to, three dimensional shaped articles, such as: automotive body parts, such as bumpers and body panels; lenses, such as optical lenses, ophthalmic lenses (e.g., tinted ophthalmic lenses) and sunshade lenses (i.e., lenses used in non-corrective sunglasses); transparencies (also referred to as windows or glazings), such as automotive transparencies, aircraft transparencies, and residential and commercial transparencies; and identification cards (e.g., personal identification cards, such as work-place security identification cards and driver's licenses, and animal tags, such as cattle tags). In an embodiment, the method of the present invention is used to prepare cattle tags having one dimensional and/or two dimensional bar codes on the second surface of the thermoplastic label.

The present invention has been described with reference to specific details of particular embodiments thereof. It is not intended that such details be regarded as limitations upon the scope of the invention except insofar as and to the extent that they are include in the accompanying claims.

What is claimed is:

1. A method of preparing a molded article comprising the sequential steps of:
    (a) providing a laminate comprising,
        (i) a carrier film having a first surface and a second surface, and
        (ii) a plurality of separate thermoplastic labels each having a first surface and a second surface, the second surface of said labels being free of decoration, the first surface of each label being superposed over the second surface of said carrier film, said carrier film being releasable from each of said labels;
    (b) applying, in-line, a decoration on the second surface of said labels of said laminate, thereby forming a decorated laminate;
    (c) indexing said decorated laminate into a mold having an interior surface, the first surface of said carrier film abutting at least a portion of the interior surface of said mold;
    (d) injecting plastic material into said mold against the decorated second surface of said label, thereby forming a molded article; and
    (e) separating said carrier film from said molded article, wherein at least a portion of the surface of said molded article is defined by the first surface of at least one label, further wherein said laminate is formed by a process comprising,
    (I) providing a precursor laminate comprising,
        (i) said carrier film, and
        (ii) a thermoplastic film having a first surface and a second surface, the second surface of said carrier film being superposed over the first surface of said thermoplastic film, said carrier film being releasable from said thermoplastic film;
    (II) die-cutting said precursor laminate such that the thickness of said thermoplastic film is fully penetrated while said carrier film is not substantially penetrated, and
    (III) separating excess portions of said thermoplastic film from said carrier film, thereby forming said laminate comprising said carrier film and said plurality of separate thermoplastic labels.

2. The method of claim 1 wherein sequential steps (a) through (e) are performed continuously.

3. The method of claim 1 wherein said carrier film is fabricated from a material selected from the group consisting of paper, thermoplastic vinyl polymers, thermoplastic polyolefins, thermoplastic poly(meth)acrylates, thermoplastic polyesters, thermoplastic polycarbonates, cellulose derivatives and combinations thereof.

4. The method of claim 3 wherein said carrier film is fabricated from a material selected from the group consisting of thermoplastic polyvinyl chloride, thermoplastic polyethylene, thermoplastic polypropylene, thermoplastic polystyrene, cellulose acetate, cellulose acetate butyrate, ethyl cellulose, cellophane and combinations thereof.

5. The method of claim 1 wherein said carrier film has a thickness of from 7.6 microns to 76.2 microns.

6. The method of claim 1 wherein said thermoplastic labels are fabricated from a material selected from the group consisting of thermoplastic polyurethane, thermoplastic poly(meth)acrylate, thermoplastic graft copolymer, thermoplastic polyamide, thermoplastic polyester, thermoplastic polycarbonate and combinations thereof.

7. The method of claim 6 wherein said thermoplastic labels are selected from the group consisting of single layer thermoplastic labels and multi-layer thermoplastic labels.

8. The method of claim 7 wherein said thermoplastic labels comprise at least one thermoplastic polyurethane layer.

9. The method of claim 1 wherein said thermoplastic labels have a thickness of from 6.4 microns to 12,700 microns.

10. The method of claim 1 wherein the decoration applied to the second surface of said labels is selected from the group consisting of indicia, patterns, designs and combinations thereof.

11. The method of claim 10 wherein said decoration is selected from at least one of one-dimensional bar codes and two-dimensional bar codes.

12. The method of claim 1 further comprising collecting and reusing said carrier film after it is separated from said molded article.

13. The method of claim 1 wherein the first surface of said thermoplastic label has a decoration thereon.

14. The method of claim 1 wherein the plastic material injected into said mold is selected from the group consisting of thermoplastic materials, thermoset plastic materials and combinations thereof.

15. The method of claim 14 wherein the plastic material injected into said mold is a thermoplastic material selected from the group consisting of thermoplastic polyurethane, thermoplastic polyurea, thermoplastic polyimide, thermoplastic polyamide, thermoplastic polyamideimide, thermoplastic polyester, thermoplastic copolyester, thermoplastic polycarbonate, thermoplastic polysulfone, thermoplastic polyketone, thermoplastic polyethylene, thermoplastic polypropylene, thermoplastic acrylonitrile-butadiene-styrene polymers, thermoplastic polystyrene, thermoplastic silicones, thermoplastic acrylic ester-modified styrene acrylonitrile termolymers, thermoplastic ethylene-vinyl acetate polymers, thermoplastic acrylonitrile ethylene styrene polymers and mixtures or thermoplastic compositions containing one or more thereof.

16. The method of claim 14 wherein the plastic material injected into said mold is reinforced with a material selected from the group consisting of glass fibers, glass beads, carbon fibers, metal flakes, polyamide fibers, nanoparticulate clays, talc and mixtures thereof.

17. The method of claim 1 wherein the molded article prepared by said method is selected from the group consisting of automotive body parts, optical lenses, ophthalmic lenses, sunshade lenses, transparencies and identification cards.

18. The method of claim 17 wherein the molded article prepared by said method is an animal tag, and the decoration applied to the second surface of said label is selected from the group consisting of one dimensional bar codes, two dimensional bar codes and combinations thereof.

19. The method of claim 1 wherein said decoration comprises a colorant selected from the group consisting of static colorants, photochromic colorants, electrically conductive colorants and combinations thereof.

20. The method of claim 1 wherein said decoration comprises at least one photochromic colorant.

21. The method of claim 20 wherein the molded article prepared by said method is selected from the group consisting of photochromic ophthalmic lenses, photochromic sun lenses and photochromic glazings.

* * * * *